Sept. 12, 1967 R. R. BILDERBACK 3,341,708
AMPLITUDE MODULATED LASER TRANSMITTER
Filed Dec. 27, 1965 2 Sheets-Sheet 1

*INVENTOR*
ROBERT R. BILDERBACK

BY
*ATTORNEYS*

United States Patent Office

3,341,708
Patented Sept. 12, 1967

3,341,708
AMPLITUDE MODULATED LASER TRANSMITTER
Robert R. Bilderback, Friendswood, Tex., assignor to the United States of America as represented by the Administrator of the National Aeronautics and Space Administration
Filed Dec. 27, 1965, Ser. No. 516,793
4 Claims. (Cl. 250—199)

ABSTRACT OF THE DISCLOSURE

An apparatus for amplitude modulation of a diode laser wherein a voltage pulse forming and energy storage network is charged with a D.C. power supply and is adapted to discharge periodically through a lasing diode. Discharge of the network is accomplished by a switch in the form of a silicon controlled rectifier triggered by voltage pulses from a pulse generator. The resulting current pulses which pass through the SCR switch are delivered to a modulating transistor in series with the lasing diode. The modulator varies the amplitude of the pulses in correspondence with the amplitude characteristics of an audio signal coupled to the transistor base.

---

Figure 1:
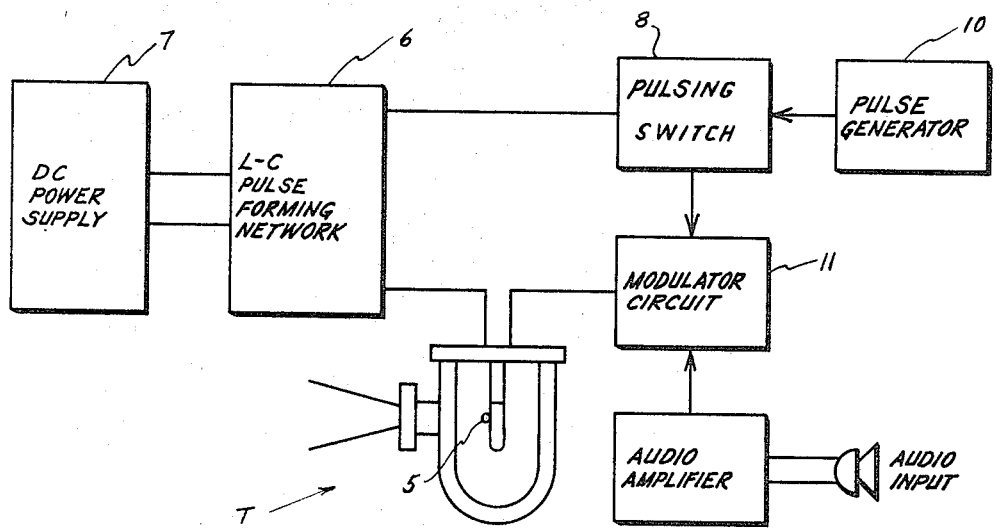

The invention described herein was made by an employee of the United States Government and may be manufactured and used by or for the Government for governmental purposes without the payment of any royalties thereon or therefor.

This invention relates to modulation of coherent light wave energy produced by stimulated emission from laser-type devices, and more particularly to amplitude modulated transmitters of wave energy in the optical region of the electromagnetic spectrum.

The extremely high frequencies associated with optical wave energy affords practically unlimited bandwidth, so that transmission of enormous quantities of information over such a radiation beam is made possible. Consequently, the information carrying capability of laser beams, and their characteristically small beam widths which minimize the radiation of energy in directions that are not useful, represent distinct advantages over radio frequency communication systems. However, the efficient utilization of laser beams as communications media is largely dependent on the means for modulating the wave energy at these very high frequencies. Prior techniques of transmitting in the audio frequency range by means of lasers have generally employed frequency modulated systems requiring complex circuitry and numerous components that distract from system reliability.

The laser transmitter of this invention which has been devised to overcome the disadvantages inherent in conventional laser transmitters is an amplitude-modulated solid state electrically pumped device designed for use in optical communications systems. The transmitter comprises a voltage pulse forming and energy storage network which is charged by a D.C. power supply, and is adapted to discharge periodically through a gallium arsenide lasing diode which emits in the near infrared portion of the electromagnetic spectrum. Discharge is accomplished by a pulsing switch in the form of a silicon controlled rectifier (SCR) which is triggered by voltage pulses from a pulse generator. The resulting current pulses which pass through the SCR to the emitting diode are modulated by a modulator circuit in the form of a single transistor connected emitter-to-collector in series with the emitting diode pulse circuit, and which varies the amplitude of the pulses fed to the emitting diode in response to audio signals from an audio amplifier which is coupled to the transistor base. For effective operation, the pulse generator supplies trigger pulses to the SCR pulsing switch at a frequency well above the modulation frequency. Since the transistor modulator of this invention does not employ transformers, it readily lends itself to miniaturization by the use of solid state components.

Figure 2:
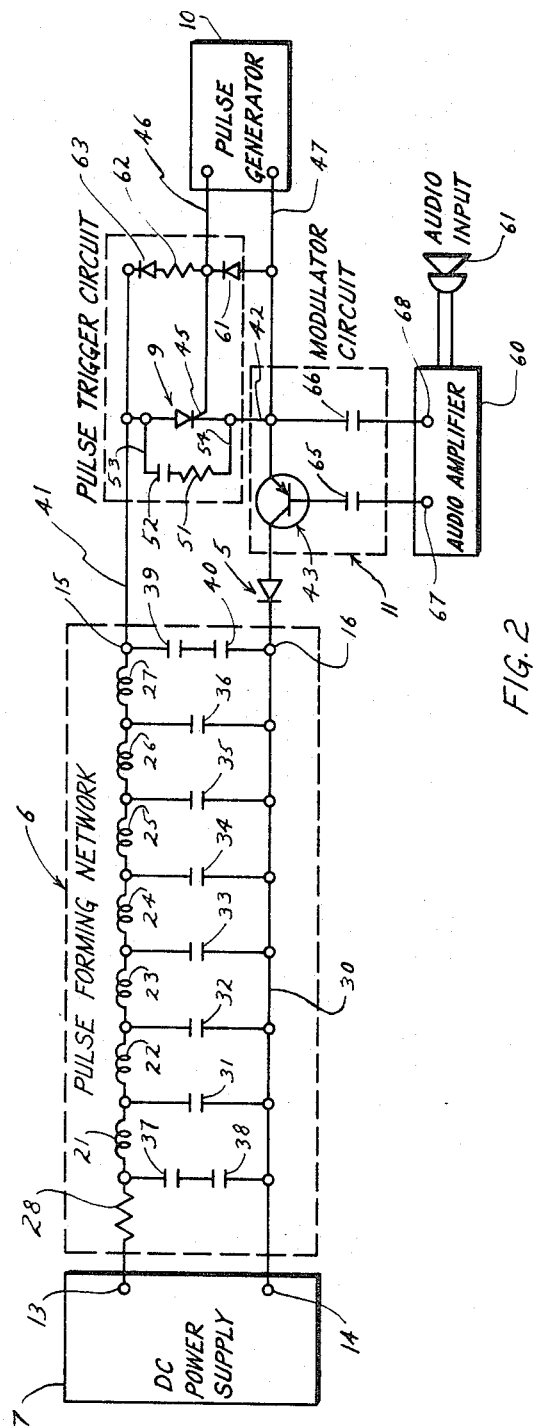

Other advantages and features of the invention, both as to its construction and mode of operation, will be readily appreciated as the same become better understood by reference to the following detailed description when considered in connection with the accompanying drawings in which like reference numerals designate like parts throughout the figures, and wherein:

FIG. 1 is a block diagram showing the major components of the amplitude-modulated transmitter of this invention; and FIG. 2 is a diagram of the transmitter of FIG. 1, showing some of the components of the transmitter in schematic form.

Referring more particularly to the drawings, the transmitter T which represents one embodiment of this invention, comprises a gallium arsenide lasing diode 5 which is adapted to emit light wave energy in the near infrared region of the electromagnetic spectrum. The diode is stimulated to emission by current pulses produced by a pulse forming network 6 which is charged by a D.C. power supply 7. The diode has the characteristic of emitting monochromatic coherent light wave energy which is proportional in intensity to the amplitude of the current applied.

The function of the pulse forming network 6 is the storage of energy and the subsequent delivery of the same energy at a predetermined rate in the form of pulses to the lasing diode. Discharge of the network is accomplished by a pulsing switch 8 in the form of a silicon controlled rectifier 9 which is triggered by a pulse generator 10. Network pulses are delivered to the lasing diode 5 through a modulator circuit 11 when the silicon controlled rectifier is periodically rendered conductive by positive going voltage pulses from the pulse generator 10.

As shown in FIG. 2, the pulse forming network 6, which comprises a plurality of distributed inductances and capacitances, is provided with a pair of input terminals 13 and 14, and a pair of output terminals 15 and 16. In the network, a plurality of inductors 21–27 are serially connected to one another, with one end inductor 27 being connected to the output terminal 15 and the other end inductor 21 being connected to the input terminal 13 through a resistance 28. The network also comprises a plurality of capacitances 31–38 which are electrically connected in parallel with each capacitor having one side connected to a common conductor 30 and its other side joined to a different one of the common junctions between the serially-connected pairs of inductors. The conductor 30 also joins the input terminal 14 and the output terminal 16 of the network.

At the input end of the network 6 a pair of capacitances 37 and 38 are connected in series with one side of the capacitance 37 being connected to the common junction between the resistance 22 and inductor 21 and one side of the capacitance 38 connected to the common conductor 30. A similar pair of serially-connected capacitances 39 and 40 are located at the output end of the network and are connected across the network output terminals. The capacitors 31–40 in the network are equal valued, as are the inductors 21–27. In one model of the transmitter, the capacitances used are 0.025 microfarad capacitors, the inductances are each 0.27 microhenries, and the resistance 28 has a value of 400 ohms. A Hewlett-Packard 711A power supply is used to supply energy to the pulse forming network.

When the network is connected to the D.C. power supply, it draws energy from the power supply and stores the energy in the capacitors 31–40. The direct current charging the capacitors is impeded very little by the inductors 21–27, and the LC time constant is approximately 1 sec. The R–C time constant for charging capacitors 37 and 38, however, is 5 μsecs.

The pulsing switch 8 is connected to the output terminal 15 of the network 6 by a conductor 41 which is also connected to the anode of the SCR. The cathode of the SCR is coupled by a conductor 42 to the emitter of a PNP transistor 43 in the modulator circuit which is connected emitter-to-collector in series with the lasing diode. The pulse generator 10 supplies positive voltage pulses of 0.1 microsecond pulse width and 10 volts amplitude to the SCR gate 45. The SCR is coupled to one terminal of the pulse generator by a conductor 46. A second terminal of the pulse generator is coupled to the cathode of the SCR by a conductor 47. In the model of the transmitter described herein, a Hewlett-Packard 212A pulse generator was employed to supply trigger pulses at a 5 kc. frequency. Also, the SCR used in the pulsing switch 8 is desirably a high current low voltage device which can be used in a very low current switching application, with currents less than 10 milliamperes. For this purpose a Westinghouse SCR type IN 1799 can be used.

When the SCR is gated closed by a positive going voltage pulse from the pulse generator, current flow through the SCR is instantaneous and quickly reaches a peak and begins a decline as the back E.M.F. builds up in the inductors 21–27. The pulse width of this "partial pulse" of current through the SCR is determined by the L–C time constant in the pulse forming network 6 which is approximately 1 microsecond, and corresponds to the maximum possible pulse width of pulses that can be applied to the SCR gate by the pulse generator 10. Also, the steepness of the leading edge of this pulse is proportional to the number of L–C combinations included in the network 6.

As the pulse begins to decline, the SCR pulsing switch opens. A ringing about zero voltage results when the switch is opened, and the phenomenon is partially eliminated by means of a series connected resistor 51 and capacitor 52 which are connected in circuit across the SCR by conductors 53 and 54. The time constant of this resistor-capacitor combination is selected to approximate one-fourth that of the current pulse through the SCR.

A gate clamping circuit about the SCR is also provided which comprises a serially connected semiconductor diode 61, a resistance 62, and a semiconductor diode 63. The diode 61 is connected across the conductors 46 and 47 and the terminals of the pulse generator by the connection of its anode to the conductor 47, and its cathode to the conductor 46. The junction of the series connected resistor 62 and diode 63 is coupled to the SCR gate 45, and the cathode of the diode 63 is coupled to the anode of the SCR. The gate clamping circuit serves for the attenuation of positive gate signals whenever the anode of the SCR is negative.

The modulator for the transmitter is a PNP transistor which is connected emitter-to-collector in series between the pulsing switch and the lasing diode. The 5 kc. pulses which pass from the SCR through the transistor are varied in amplitude in accordance with the modulation which is applied to the base of the transistor by means of a modulating audio signal from an audio amplifier 60. The amplifier 60 receives the input signal from a microphone 61, or the like. A D.C. blocking capacitor 65 is coupled between one ouput terminal 67 of the audio amplifier and the base of transistor 43. A similar D.C. blocking capacitor 66 is coupled between a second output terminal of the amplifier and the emitter of transistor 43.

It is to be noted that the pulsing switch utilizes a high current silicon control rectifier for a low RMS current application. The high current SCR is operated well below its RMS holding current and remains conductive or closed only as long as the trigger pulse is applied. When the trigger pulse is removed, the RMS current is too low to maintain conduction and the current ceases to flow.

By taking advantage of this characteristic, none of the usual "turn-off" circuitry is required for the SCR. Also, by operating the SCR at very low RMS currents and applying trigger voltages in excess of the rated values, pulses of the order of 150 nanoseconds have been obtained. Under these conditions the SCR displays a linear increase in conductivity with increasing trigger potential.

From the above description it will be apparent that the amplitude modulated transmitter of this invention is particularly adapted for use as an active element in an optical communications system. Although gallium arsenide which emits in the near infrared was used as a lasing material in the transmitter described herein, any lasing material requiring a low impedance input and high peak current pulses may be used in this system which is adapted for any system requiring a carrier in the ultraviolet visible or infrared region of the spectrum.

It is also to be noted that the amplitude modulator transmitter of this invention presents a simple and compact system with comparatively few components, and a consequent inherent increase in reliability. Furthermore, since the basic components of the system may be comprised entirely of solid state devices, the system readily lends itself to miniaturization. The galliumarsenide diode used in the model described herein is a General Electric Model LED 2 which is enclosed by a liquid nitrogen dewar.

It should also be understood that the foregoing disclosure relates only to preferred embodiments of the invention and that it is intended to cover all changes and modifications of the examples in the invention herein chosen for the purposes of the disclosure and which do not constitute departure from the spirit and scope of the invention.

What is claimed and desired to be secured by Letters Patent is:

1. Apparatus for transmission of an amplitude modulated radiation beam of optical frequency produced by the stimulated emission of radiation, said apparatus comprising a lasing means for emitting a coherent radiation beam of electromagnetic wave energy of optical frequency when supplied with current pulses;

pulsing means for storing electrical energy and periodically delivering the energy in the form of current pulses to said lasing means to produce said radiation beam, said pulsing means comprising an electrical energy storage network and an intermittent switch means interposed in circuit between the storage network and the lasing means, said switch means being operative to periodically couple said energy storage network to said lasing means at regular intervals for the delivery of current pulses therto; and modulating means interposed in series between said switch means and said lasing means for modulating the amplitude of current pulses delivered to the lasing means from said energy storage network in accordance with the amplitude variations of an audio voltage signal whereby said lasing means emits a series of amplitude-modulated radiation pulses at constant repetition rate.

2. An apparatus for transmission and amplitude modulation of light wave energy as defined in claim 1, wherein said intermittent switching means comprises a silicon controlled rectifier connected in circuit between said electrical energy storage network and said lasing means, and voltage pulse generating means delivering voltage pulses to the silicon controlled rectifier at regular spaced intervals to render the rectifier intermittently conductive, whereby current pulses are delivered to the lasing means for stimulated emission of radiation.

3. An apparatus for transmission and amplitude modulation of light wave energy as defined in claim 1, wherein said modulating means comprises a single transistor connected emitter-to-collector in series between said pulsing means and said lasing means; and audio signal input means for coupling an electrical signal of audio frequency to the base of the transistor, whereby the current pulses delivered to the lasing means are modulated in accordance with the amplitude variations of the audio input signal.

4. An apparatus for transmission of amplitude modulated light wave energy as defined in claim 1, whereby said lasing means is a semiconductor diode.

References Cited
UNITED STATES PATENTS

| | | |
|---|---|---|
| 3,156,826 | 11/1964 | Mutschler. |
| 3,166,673 | 1/1965 | Vickery. |
| 3,171,031 | 2/1965 | Yariv. |
| 3,174,044 | 3/1965 | Tien. |
| 3,245,002 | 4/1966 | Hall. |
| 3,258,596 | 6/1966 | Green _____ 250—199 |

OTHER REFERENCES

Electronics, May 31, 1963, P. 16, 250–199.

Goldstein et al.: Proc. I.E.E.E., vol. 52, No. 6, June 1964, pp. 715–717, 250–199.

JOHN W. CALDWELL, *Acting Primary Examiner.*